(12) United States Patent
Graves

(10) Patent No.: US 6,601,887 B2
(45) Date of Patent: Aug. 5, 2003

(54) LEVERAGE ENHANCEMENT ARRANGEMENT FOR TOOL

(76) Inventor: David E. Graves, 58 Middle St., Gloucester, MA (US) 01930

(*) Notice: Subject to any disclaimer, the term of this patent is extended or adjusted under 35 U.S.C. 154(b) by 0 days.

(21) Appl. No.: 09/780,844

(22) Filed: Feb. 9, 2001

(65) Prior Publication Data

US 2002/0109364 A1 Aug. 15, 2002

(51) Int. Cl.[7] .............................. A01B 1/22; B25G 3/20
(52) U.S. Cl. .................................................. 294/58
(58) Field of Search .......................... 294/25, 49, 54.5, 294/57, 58, 59, 51; 16/111.1, 422, 426; 37/265, 285; 254/131.5

(56) References Cited

U.S. PATENT DOCUMENTS

| | | | | |
|---|---|---|---|---|
| 1,524,168 A | * | 1/1925 | Burns ........................... | 294/58 |
| 2,430,802 A | * | 11/1947 | Catlin ........................... | 294/58 |
| 2,846,785 A | * | 8/1958 | Underwood ........... | 294/54.5 X |
| 4,128,226 A | | 12/1978 | Vaslas | |
| 4,787,661 A | * | 11/1988 | Rutledge ..................... | 294/58 |
| 4,993,768 A | * | 2/1991 | Ewen ........................... | 294/51 |
| 5,065,475 A | | 11/1991 | Watt | |
| 5,400,471 A | | 3/1995 | Lichfield et al. | |
| 5,411,305 A | * | 5/1995 | Revoldt ........................ | 294/58 |
| 5,669,650 A | | 9/1997 | Butz | |
| 6,053,548 A | * | 4/2000 | Bowles ...................... | 294/58 X |

FOREIGN PATENT DOCUMENTS

| | | | | |
|---|---|---|---|---|
| BE | 531941 | * | 10/1954 | ................... 294/58 |
| GB | 2266438 | * | 11/1993 | ................... 294/58 |
| WO | 91/17647 | * | 11/1991 | ................... 294/58 |

* cited by examiner

*Primary Examiner*—Johnny D. Cherry
(74) *Attorney, Agent, or Firm*—Don Halgren

(57) ABSTRACT

A frame assembly for attachment to an elongated shaft of a tool. The frame assembly is arranged to increase the leverage and handling capabilities of the tool. The frame assembly comprises a generally triangularly shaped frame having a housing portion leg, a forward leg and a rearward leg. The forward and the rearward legs meet at an apex of the frame assembly. A securement mechanism secures the housing portion leg to the shaft of the tool. An articulable handle is arranged on the apex of the frame assembly to permit the tool to be leveraged by a user of the frame assembly in an enhanced manner.

13 Claims, 2 Drawing Sheets

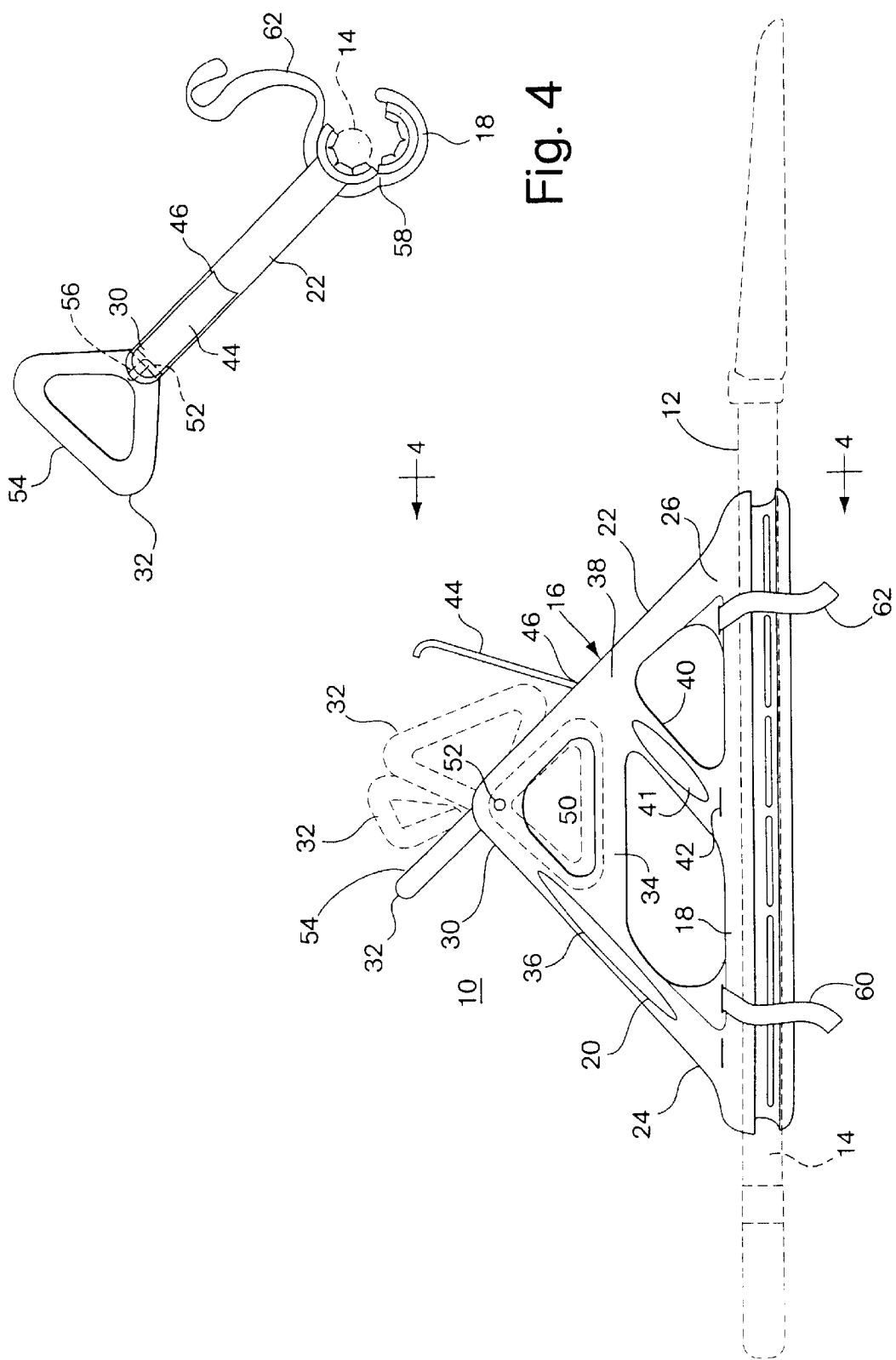

LEVERAGE ENHANCEMENT ARRANGEMENT FOR TOOL

BACKGROUND OF THE INVENTION

1. Field of the Invention

This invention relates to apparatus for enhancing leverage of hand held tools and more particularly to a frame assembly which is attachable to a shaft of a tool such as a shovel for improving its leverage.

2. Prior Art

Long handled tools such as shovels and rakes and the like have been around for centuries. Their use is necessary but the work therewith is difficult. By their very structure, they become back-straining tools. They are difficult to lift with a load on the far end, and attachments to facilitate their use are often cumbersome to attach and are a problem to store.

U.S. Pat. No. 4,128,266 to Vaslas shows an auxiliary handle for shovels. While this may permit some leverage in its use, its application is difficult and its storage is a problem. U.S. Pat. No. 5,065,475 to Watt shows a handle attachment for a broom or rake to facilitate gripping thereof. However, such a handle attachment would not be readily usable for lifting or manipulating heavy loads. U.S. Pat. No. 5,400,471 to Lichfield et al. shows an auxiliary handle for a shovel. While this improves the field, it is not readily storable and may be somewhat cumbersome. U.S. Pat. No. 5,669,650 to Rutz shows an adjustable auxiliary handle for a long handled tool. This arrangement appears to provide some gripping, but it still fails to provide the leverage necessary for heavy loads nor does it demonstrate an on-tool storage capability utilizing minimal space.

It is an object of the present invention to overcome the deficiencies of the prior art.

It is a further object of the present invention to provide an auxiliary handle arrangement which provides multiple equipment-handling arrangements on its structure.

It is yet a further object of the present invention to provide an auxiliary handle arrangement on an elongated tool wherein the handle arrangement is readily stored within a flat space with the tool.

It is still yet a further object of the present invention, to provide an auxiliary handle arrangement wherein the portions of that handle are self-storable.

It is still yet a further object of the present invention to provide an auxiliary handle arrangement which is readily attachable and dis-attachable from a tool shaft.

BRIEF SUMMARY OF THE INVENTION

The present invention comprises a leverage enhancing auxiliary handle arrangement for a tool with an elongated shaft thereon, such as a shovel or a rake. The auxiliary handle arrangement of the present invention comprises a generally triangularly shaped frame, having a first leg or housing portion which encloses the elongated shaft of the tool being enhanced. The auxiliary handle arrangement also has a second portion such as a rearward leg and a third portion defined as a forward leg. The rearward leg has a first end which is unitary with the housing portion and the forward leg has a first end which is unitary with the housing portion. The forward and rearward legs meet at an apex of the frame.

An articulable frame handle is hingedly disposed at the apex of the frame. An elongated mid-bar extends between a mid-portion of the rearward leg and a mid-portion of a frontward or forward leg and generally parallel to the housing portion of the frame. A front bar extends unitarily generally from a mid-portion of the housing enclosure to a mid-portion of the forward leg, the front bar being generally parallel to the rearward leg.

The forward leg has a hingedly openable panel thereon. When the panel in the forward leg is pivoted about its lowermost edge, a generally triangularly shaped storage space is presented and usable in the upper portion of the frame assembly.

The frame handle is attached to the apex of the frame assembly by a first axis or rotatable hinge. The frame handle has a hand grip portion which is generally transverse to the plane of the frame assembly. The hand grip portion may be also twisted about a second axis, so as to be within the plane of the frame assembly and pivoted above its axis so as to be swung into the generally triangularly arranged storage within the upper apex portion of the frame assembly. The second axis is connected to a part of the hinge of the first axis so as to in-effect, permit universal motion of the grip handle.

The elongated primary housing portion of the frame assembly comprises an elongated enclosure by which the frame assembly surrounds the elongated tool shaft of the tool shovel. The housing is split along its longitudinal axis to permit the housing to open about an elongated hinge on one side thereof. Each side of the split housing thus defines a curvilinear or "c"-shaped portion as seen in cross-section, each defining an arc of about 180 degrees. The split housing is securable about the elongated tool shaft by a pair of adjustable straps having securement means thereon such as Velcro™.

The split housing has inner surfaces which may be lined with an insert so as to facilitate gripping of the frame apparatus about the elongated tool shaft or alternatively, such insert permits the relative sliding or pivoting of the frame apparatus both longitudinally and/or peripherally about that elongated tool shaft.

During storage of the tool such as a shovel or a rake, in its "non-use" season, the frame grip handle may be pivoted about its axis and stored within the apex of the frame assembly after the hinged panel has been opened on the forward leg thereof. The entire frame apparatus may also be pivoted about 90 degrees about its longitudinal axis of the split housing, so as to lie in the plane of the business end of the tool, such as the shovel blade or rake end thereof. Such articulation of the frame handle end and the frame assembly permits storage of such tool with the frame apparatus thereon in a minimal volume of space. Thus what has been shown is a unique leverage enhancing auxiliary handle apparatus which provides unique gripping capabilities to the user with relative movability thereof with respect to the tool so as to optimize comfort of the user while also permitting self storage of portions of that auxiliary handle apparatus and storage of the apparatus itself with the tool or without the tool thereattached, in a minimal storage space.

The invention thus comprises a frame assembly for attachment to an elongated shaft of a tool, the frame assembly being arranged to increase the leverage and handling capabilities of the tool. The frame assembly comprises a generally triangularly shaped frame having a housing portion leg, a forward leg and a rearward leg. The forward and rearward legs meet at an apex of the frame assembly. A securement mechanism secures the housing portion leg to the shaft of the tool. An articulable handle is arranged on the apex of the frame assembly to permit the tool to be leveraged by a user of the frame assembly in an enhanced manner.

The housing portion leg may have an insert arranged therein to fit between the housing portion leg and the shaft of the tool. The forward leg may have an openable panel thereon to permit entry of the articulable handle to a storage space therewithin. The articulable handle may be attached to the frame assembly by a first axis. The articulable handle may be attached to the frame assembly by a second axis. The articulable handle is pivotable into a storage space within the apex of the frame assembly. The articulable handle is rotatable about an axis to permit the articulable handle to lie in the plane of the frame assembly for compactness of storage. The frame assemble is rotatable about the shaft of the tool to permit the frame assembly to lie in the plane of the tool, for compactness of storage.

The securement mechanism may comprise an arrangement of adjustable straps for tightening the housing portion to the shaft of the tool. The frame may include a mid-bar and a front bar arranged between the front and rearward legs and the housing portions to strengthen the frame assembly and permit further portions for gripping thereof by a user of the tool. At least one of the leg portions may have a reflective indicia thereon for safety purposes during night use of the tool. The frame is preferably unitarily formed from an injected molded plastic. The housing portion is splitable longitudinally into a pair of elongated generally "C" shaped portions arranged to readily mate about a shaft of the tool. The elongated "C" shaped portions may have a "C" shaped insert for inclusion therewith, to facilitate fitting therewith about the shaft of the tool.

The invention may also comprise a method of storing an elongated shaft tool with a leverage enhancing frame assembly thereon. The method may comprise the steps of: providing a gripping handle on an apex of the frame assembly attached to the shaft of the tool; and pivoting the handle with respect to the frame so that the handle lies in the plane of the frame assembly, to minimize the volume that the tool and frame assembly utilize; pivoting the frame assembly about the shaft of the tool to permit the frame and the tool to lie in a common plane.

BRIEF DESCRIPTION OF THE DRAWINGS

The objects and advantages of the present invention will become more apparent when viewed in conjunction with the following drawings, in which;

FIG. 3 is a side elevational view of the auxiliary frame apparatus showing the frame handle component thereof in several stepwise positions; and FIG. 4 is a view taken along the lines 4—4 FIG. 3.

DESCRIPTION OF THE PREFERRED EMBODIMENTS

Figure 1:
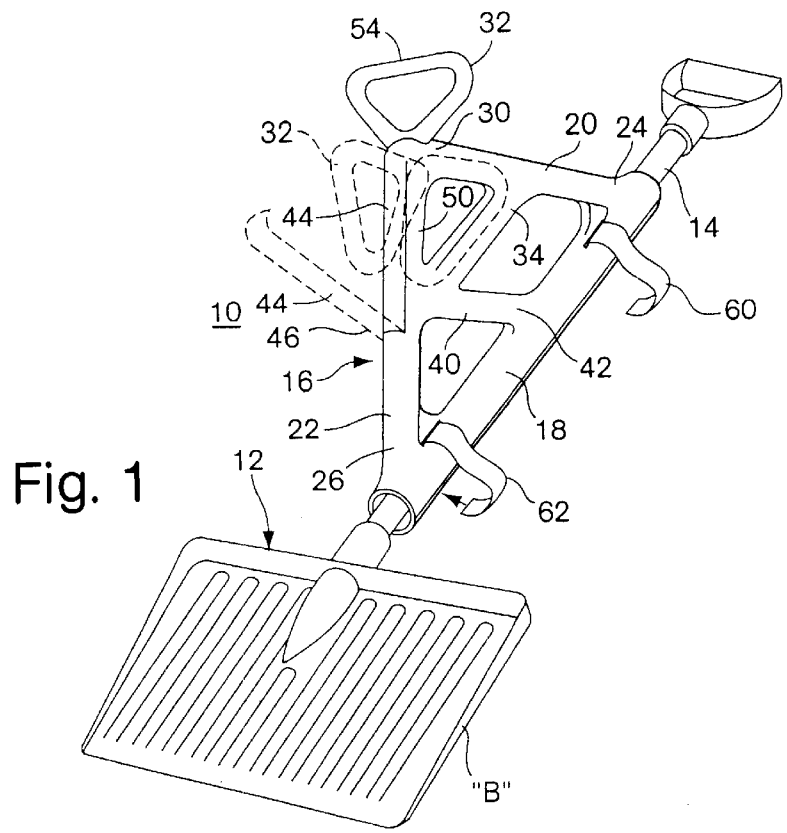
FIG. 1 is a perspective view of an auxiliary handle apparatus constructed according to the principles of the present invention shown on an elongated shaft of a tool, such as a shovel.

Referring now to the drawings in detail, and particularly to FIGS. 1 and 3, there is shown the present invention which comprises a leverage enhancing auxiliary handle arrangement 10 for a tool 12 with an elongated shaft 14 thereon, such as a shovel or a rake. The auxiliary handle arrangement 10 of the present invention comprises a generally triangularly shaped frame 16, having a first leg or housing portion 18 which encloses at least a portion of the elongated shaft 14 of the tool 12 being enhanced. The auxiliary handle arrangement 10 also has a second portion such as a rearward leg 20 and a third portion defined as a forward leg 22. The rearward leg 20 has a first end 24 which is unitary with the housing portion 18 and the forward leg 22 has a first end 26 which is also unitary with the housing portion 18. The forward and rearward legs 20 and 22 meet at an apex 30 of the frame 16, the legs 20 and 22 and housing portion 18 defining a plane.

An articulable frame handle 32 is hingedly disposed at the apex 30 of the frame 16, as may be seen in FIGS. 1 and 3. An elongated mid-bar 34 extends between a mid-portion 36 of the rearward leg 20 and a mid-portion 38 of the frontward or forward leg 22 and is generally parallel to the housing portion 18 of the frame 16. A front bar 40 extends unitarily generally from a mid-portion 42 of the housing enclosure 18 to the mid-portion 38 of the forward leg 22, the front bar 40 being generally parallel to the rearward leg 20. A reflector 41 may be arranged on the front bar 40, as may be seen in FIG. 3, or on another leg, not shown for clarity, to permit safe use of the tool 12 during evening hours.

The forward leg 22 has a hingedly openable panel 44 thereon. When the panel 44 in the forward leg 22 is pivoted about its lowermost edge 46, a generally triangularly shaped storage space 50 is presented and usable in the upper portion of the frame assembly 16, as shown in FIGS. 1 and 3.

The frame handle 32 is attached to the apex 30 of the frame assembly 10 by a first axis 52 or rotatable hinge, as shown in FIG. 3. The frame handle 32 has a hand grip portion 54 which is generally transverse to the plane of the frame assembly 10. The hand grip portion 54 and frame handle 32 may be also twisted about a second axis 56, as also shown in FIG. 4, so as to be within the plane of the frame assembly 10 and pivoted about its first axis 52 so as to be swung into the generally triangularly arranged storage space 50 within the upper apex portion 30 of the frame assembly 10. The second axis 56 is connected to a part of the hinge of the first axis 52 so as to in-effect, permit universal motion of the grip handle 32.

Figure 2:
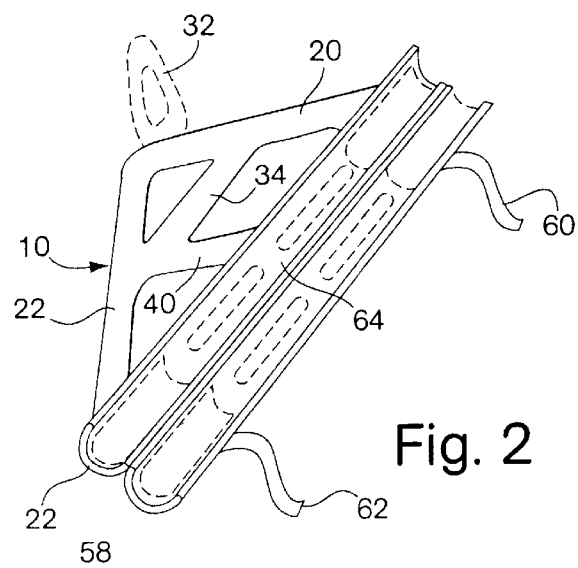
FIG. 2 is a perspective view of the auxiliary handle apparatus in an open configuration.

The elongated primary housing portion 18 of the frame assembly 10 comprises an elongated enclosure by which the frame assembly 10 surrounds the elongated tool shaft 14 of the tool shovel 12, as may be seen in FIGS. 1, 2, 3 and 4. The housing portion 18 is split along its longitudinal axis to permit the housing 18 to open about an elongated hinge 58 on one side thereof, as shown in FIG. 2. Each side of the splitable housing 18 thus defines a curvilinear or "C"-shaped portion as seen in cross-section, each defining an arc of about 180 degrees, as may be seen in FIGS. 2 and 4. The splitable housing 18 is securable about the elongated tool shaft by a pair of adjustable straps 60 and 62, as shown in FIGS. 1, 2, 3 and 4, each strap 60 and 62 having a securement means thereon such as for example Velcro™ fasteners.

Figures 2A, 2B:
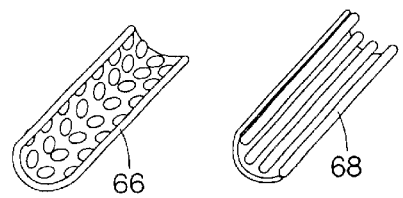
FIG. 2A is a perspective view of a portion of an insert arrangeable for use within the frame apparatus.
FIG. 2B is a further embodiment of an insert for use within the frame apparatus.

The splitable housing 18 has inner surfaces 64 which may be lined with a soft gripping insert 66 or a harder, smooth, relatively slidable insert 68, as shown in FIGS. 2A and 2B, so as to facilitate gripping or engagement of the frame apparatus 10 about the elongated tool shaft 14 or alternatively, such insert 66 or 68 permits the relative sliding or pivoting of the frame apparatus 10 both longitudinally and/or peripherally about that elongated tool shaft 14.

During storage of the tool 12 such as a shovel or a rake, in its "nonuse" season, the frame grip handle 32 may be pivoted about its second axis 56 and stored within the storage area 50 in the apex 30 of the frame assembly 10 after the hinged panel 44 has been opened on the forward leg 22 thereof. The entire frame apparatus 10 may also be pivoted about 90 degrees about its longitudinal axis of the splitable housing 18, so as to lie flat in the plane defined by the business end "B" of the tool 12 such as the shovel blade or rake end thereof, and its shaft 14, to minimize storage volume. Such articulation of the frame handle 32 and the frame assembly 10 permits storage of such tool with the frame apparatus 10 thereon in a minimal volume of space.

Thus what has been shown is a unique leverage enhancing auxiliary handle apparatus which provides unique gripping capabilities to the user with relative movability thereof with respect to, the tool so as to optimize comfort of the user while also permitting self storage of portions of that auxiliary handle apparatus and storage of the apparatus itself with the tool or without the tool thereattached, in a minimal storage space.

I claim:

1. A frame assembly for attachment to an elongated shaft of a tool, said frame assembly arranged to increase the leverage and handling capabilities of said tool, said frame assembly comprising:

a generally triangularly shaped frame having a housing portion leg, a forward leg and a rearward leg, said forward and rearward legs meeting at an apex of said frame;

a securement mechanism to secure said housing portion leg to said shaft of said tool;

an articulable handle arranged on said apex of said frame to permit said tool to be leveraged by a user of said frame assembly in an enhanced manner; and wherein said housing portion leg has an insert arranged therein to fit between said housing portion leg and said shaft of said tool.

2. The frame assembly as recited in claim 1, wherein said forward leg has an openable panel thereon to permit entry of said articulable handle to a storage space therewithin.

3. The frame assembly as recited in claim 1, wherein said articulable handle is attached to said frame for movement about a first axis.

4. The frame assembly as recited in claim 3, wherein said articulable handle is attached to said frame for movement about a second axis.

5. The frame assembly as recited in claim 1, wherein said articulable handle is pivotable into a storage space within said apex of said frame.

6. The frame assembly as recited in claim 1, wherein said frame assembly defines a plane, and said articulable handle is rotatable about an axis to permit said articulable handle to lie in the plane of said frame assembly for compactness of storage.

7. The frame assembly as recited in claim 1, wherein said frame assembly defines a plane, and is rotatable about said shaft of said tool to permit said tool to lie in the plane of said frame assembly, for compactness of storage.

8. The frame assembly as recited in claim 1, wherein said securement mechanism comprises an arrangement of adjustable straps for tightening said housing portion leg to said shaft of said tool.

9. The frame assembly as recited in claim 8, wherein said housing portion leg is splitable longitudinally into a pair of elongated generally "C" shaped portions arranged to readily mate about said shaft of said tool.

10. The frame assembly as recited in claim 9, wherein said elongated "C" shaped portions have a "C" shaped insert for inclusion therewith, to facilitate fitting therewith about said shaft of said tool.

11. The frame assembly as recited in claim 1, wherein said frame includes a mid-bar and a front bar arranged between said forward-and rearward legs and said housing portion leg to strengthen said frame assembly and provide further portions for gripping thereof by a user of said tool.

12. The frame assembly as recited in claim 1, wherein at least one of said leg portions has a reflective indicia thereon for safety purposes during night use of said tool.

13. The frame assembly as recited in claim 1, wherein said frame is unitarily formed from an injected molded plastic.

* * * * *